Figure 1:
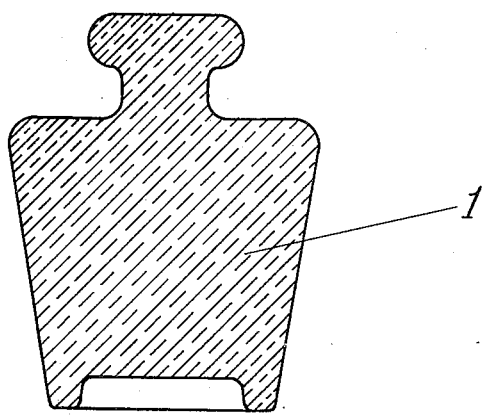

June 24, 1930. W. O. SNELLING 1,766,466
BALANCE WEIGHT
Filed Dec. 8, 1928

INVENTOR
Walter O. Snelling.

Patented June 24, 1930

1,766,466

UNITED STATES PATENT OFFICE

WALTER O. SNELLING, OF ALLENTOWN, PENNSYLVANIA

BALANCE WEIGHT

Application filed December 8, 1928. Serial No. 324,686.

My invention relates to improvements in standards of mass such as are employed in weighing operations, and more particularly my invention relates to improved balance weights of the type commonly used by chemists and physicists in weighing operations in which a high degree of accuracy or precision is required. My invention also relates to a new composition of matter from which weights of novel and advantageous type may be made. One object of my invention is to provide means by which balance weights of permanent nature and of an exceptionally high degree of accuracy may be manufactured at a relatively low cost as compared with manufacture by methods at present known.

In order to satisfactorily fulfill the normal functions of a standard of mass or weight, a balance weight must be capable of being calibrated to a high degree of equivalency with an ultimate standard of mass or weight, and after being so calibrated must remain constant, without either further loss or gain of weight within the limits of accuracy that are required.

Although it is possible by methods now known to prepare weights for the coarser operations of weighing which are entirely satisfactory for practical purposes, it has been found very difficult to prepare weights that are entirely satisfactory for the more refined operations of precision weighing. Of all of the metals at present available for the manufacture of weights, platinum has been found to possess the most satisfactory resistance to oxidation, and has accordingly been employed in the preparation of balance weights where the highest degree of accuracy is required, but as the cost of platinum has been for many years greater than the cost of an equal weight of pure gold, the use of platinum for the heavier weights of commercial sets has been impracticable for economic reasons.

As a result of the high cost of platinum, making its use impractical in the construction of the sets of balance weights ordinarily used by chemists and physicists in their every-day work, platinum has been used as the material of construction for "ultimate" or national standard of weight or mass, while brass weights have been employed and are generally used in most ordinary work.

This almost universal use of brass as the material of construction of commercial units of weight or mass has led to an anomalous situation with respect to correction for buoyancy. Although a brass kilogram weight will exactly balance a platinum kilogram weight when the two weights are compared in an absolute vacuum, the two weights will not exactly balance each other when weighed in air. Since every substance present within a fluid is buoyed up by a weight corresponding to the weight of a volume of the fluid which it displaces, it will be evident that a brass weight of any given volume when weighed in air will be buoyed up to the extent of the weight of the volume of air which the weight displaces, and similarly a platinum weight when weighed in air will be buoyed up to the extent of the weight of the volume of air which it displaces. The volume of a kilogram of platinum is less than half the volume of a kilogram of brass, and accordingly two kilogram weights, one made of brass and one made of platinum, will have quite different volumes, and although each of the two weights will possess exactly the same number of units of mass, and will accordingly balance one another when weighed in a vacuum, their apparent weight, when weighed in air, will be quite different.

Because of the adoption of platinum as the material of construction of the ultimate standards of weight and because of the unfortunate difference between the specific gravity of platinum and the specific gravity of brass, which latter material has by common usage become the material of construction of precision units of mass for commercial purposes, it is customary to apply a buoyancy or vacuum correction to all weights that are used in precision weighings as referred to the platinum ultimate standard, and a corresponding correction would have to be made if weights of any material having a lower or a higher specific gravity than that of brass were to be used in precision weighings that would be compared with weighings made with brass weights.

Although brass tarnishes relatively slowly, when exposed to atmospheric conditions, it is well recognized to slowly oxidize, with very apparent darkening of the surface, and with an increase in weight which is entirely too high to be disregarded in precision weighings. Recent work (Proc. Phys. Soc., London, Apr. 15, 1928, Ab. Jour. Franklin Inst., vol. 206, No. 4, Oct. 1928, p. 564) has afforded quantative figures for the corrodibility of brass when exposed to atmospheric agencies for even short periods of time, but it has long been recognized that brass weights slowly undergo superficial changes with alteration of weight of sufficient importance to decidedly influence weighings of precise character. Accordingly, brass weights for precision weighing are usually covered with a superficial coating of lacquer or a plating of gold or platinum for the purpose of reducing atmospheric deterioration, and weights of this general character have now, by long usage, been accepted as a secondary standard in all precision weighing operations. Correction for buoyancy is only made in work where the very highest accuracy is required, the general assumption being that even in precision operations the weight as stated is the apparent weight in air of the object weighed as balanced against balance weights having an average specific gravity of 8.4, which is the average specific gravity of brass.

I have discovered that by incorporating in suitable amounts an agglutinant or cement such as the well known thermoplastic condensation products of phenol and formaldehyde with a finely divided solid of high density such as tungsten powder obtained by the reduction of the oxide, I can obtain a product having substantially the specific gravity of brass, and offering many advantages over brass as a material for the construction of balance weights.

As an example of my present invention I will describe the method which I prefer to employ in making a 100 gram balance weight from an admixture of a condensation product of phenol and formaldehyde of the bakelite type and pulverulent metallic tungsten such as may be obtained by the reduction of tungstic oxide.

As the density of the kind of brass generally used in the manufacture of weights is 8.4, and as this figure has been accepted by the Bureau of Standards of the Department of Commerce of the U. S. Government as the commercial standard for the density of standard weights of precision, it will be evident that the over-all volume of a composition weight having the same density as a 100 gram brass weight will be obtained by dividing 100 by 8.4, and by making this calculation it will be found that the required volume is 11.905 c. c. In my composition weight it will of course be evident that the combined weight of the metallic tungsten filler and of the bakelite matrix will be 100 grams, while the respective proportions of bakelite and tungsten powder must be such that the density of the resulting product will be 8.4. If $x$ be taken as the volume in cubic centimeters of the bakelite to be used in making the 100 gram weight, and if $y$ be taken as the volume of the tungsten present in finely divided condition as tungsten powder, then it will be evident that $$x+y=11.905,$$

and using bakelite that has a specific gravity of 1.25 and tungsten having a specific gravity of 18.77, it will also be evident that $$1.25x+18.77y=100.000,$$

since the volume of the bakelite when multiplied by its specific gravity when added to the volume of the tungsten when multiplied by its specific gravity, must represent all of the mass that is present in the weight, and accordingly must total 100 grams.

Solving the equations it will be found that in the present example $x$ equals 7.046 c. c. and that $y$ equals 4.859 c. c. As parts by weight are usually desired in the making up of the thermoplastic composition, the above volumes are next changed to weights, by multiplying each by the corresponding specific gravity. By performing these calculations it will be found that 8.807 parts by weight of bakelite, or 59.2% by volume, with 91.203 parts by weight of tungsten powder, or 40.8% by volume, will give a resulting compound that will have the same specific gravity as brass, and that may accordingly be used to form weights which may be employed in weighing operations with brass weights without requiring volume or buoyancy corrections.

Although I have taken 18.77 as the specific gravity of tungsten powder, in actual experiments I have found that commercial tungsten powder varies somewhat in density, due in part to the presence of adsorbed gases and other impurities and also due in part to the presence of oxide of tungsten because of incomplete reduction of the oxide. Bakelite also varies somewhat in density, and accordingly, in the preparation of weights in accordance with my present invention, I find it desirable to use a mixture of tungsten powder and bakelite containing slightly more than 40.8% of tungsten by volume and slightly less than 59.2% of bakelite by volume, so as to obtain a base composition having a specific gravity slightly higher than 8.4, the over-all specific gravity of the finished weight being subsequently corrected by means of a small opening or cavity left in the finished weight for calibration purposes.

Figure 2:
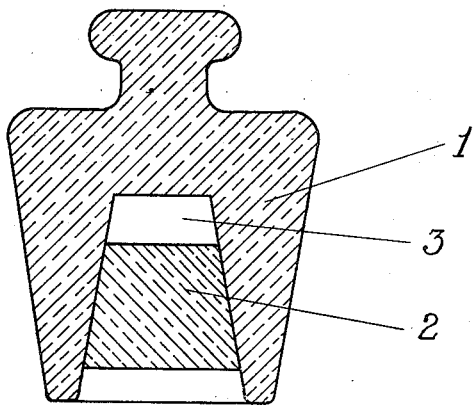

In the drawing forming part of this specification, Figure 1 is a representation of a vertical cross section through a weight made in accordance with my present invention when using a composition adjusted to have a density of 8.4. Figure 2 is a corresponding cross section through a weight constructed of a composition having a true density slightly in excess of 8.4. In Figure 2, 1 is the body of the weight, which is provided with a conical or frustro-conical opening in its bottom. 2 is a frustro-conical plug, preferably made of the same composition as 1, and capable of engaging with the walls of the cavity of 1 as shown. 3 is a cavity or chamber, by varying the size of which the apparent density of the composite weight may be controlled. The plug 2 may be adhesively secured in place in the body 1, or may be elastically held by compression by being forcibly pressed into position. An air-tight or hermetic seal is desirable.

Although I have referred to bakelite as a preferred phenolic condensation product, it will be evident that many equivalents may be used instead of this particular plastic. The basis of my invention is the production of a chemically inactive composition from a matrix material and a filler material in the form of a finely divided powder of high density, to form a solid having substantially the specific gravity of brass, and the turning, moulding or forming in any other suitable way of balance weights from this composition. As a matrix material I may employ any suitable synres, which term will be used as an embracive designation of the large group of thermoplastic condensation products of phenol, urea, phthalic acid, etc., with aldehydes, alcohols, sulfur chloride, etc., or instead of a thermoplastic condensation product as my matrix I may employ any other suitable agglutinating or cementing agent offering suitable resistance to atmospheric deterioration. The requirements of a suitable matrix material are hardness and toughness in the final polymerized, "set", hardened or reacted condition, a high cementing value for pulverulent materials and a high degree of resistance to atmospheric agencies such as oxygen and moisture, and in the moulding art a very large number of materials are known which may be employed with pulverulent fillers to form, after suitable hardening treatment, hard, tough solids of chemically inactive nature suitable for the present use. As my filler material I may employ any powdered metal having a specific gravity of 9 or more, but I recognize as equivalents of powdered metals any metallic compounds that possess the desired high specific gravity. Tungsten carbide is an example of a nonmetallic substance capable of use in pulverulent condition as a filler for use with a suitable matrix material, and other metallic carbides, oxides, borides, silicides, etc., may be used.

The material which I prefer to employ in the practice of my present invention is a composition made by admixing approximately equal parts by volume of finely divided metallic tungsten and pure uncured or intermediate moulding bakelite free from wood pulp or other of the customary fillers used in the moulding art. The resulting composition may be directly pressed and moulded into cones and cases as shown in Figure 2 of the drawing and possesses a true density sufficiently above 8.4 to permit of satisfactory adjustment of both density and weight to be made of the finished weight by the removal by attrition or by any other suitable means of any required quantity of the frustro-conical plug necessary to accurately calibrate the finished weight both with respect to true weight and apparent density. Material may be removed from either the upper or the lower flat surface of the frustro-conical plug, the removal of material from the upper flat surface decreasing the weight of the finished weight without changing its over-all volume, while the removal of material from the lower flat surface decreases both the weight of the finished weight and its over-all volume. By always making the combined weight of the body and the plug slightly in excess of the desired finished weight, and completing the calibration from either the upper or lower surface of the frustro-conical plug as may be necessary to give the desired finished density, it is a simple matter to calibrate weights made in accordance with the present invention both as to true weight and true volume on the basis of comparison with customary brass weights.

Although it is desirable that the apparent density of my finished balance weight should be 8.4, in order that no buoyancy or volume correction may be necessary when weighings are compared with weighings made with brass weights, I find it desirable to employ a mixture of matrix material and filler material which has a density of from 8.5 to 10.0, in order to provide suitable excess density to allow for the presence of a cavity within the weight for calibration purposes. Although the percentage of matrix material and filler material which I employ will of course vary with the nature and density of the particular materials used, in general I employ from 5% to 20% by weight of a cementitious matrix material having a density of 5 or less, and from 80% to 95% by weight of a pulverulent filler material having a density of 9 or more.

Although I prefer to form weights made in accordance with my present invention from a thermoplastic composition by a moulding operation, my invention is not limited to this method of forming weights, and I may, for example, first prepare a suitable mixture of a finely divided heavy solid filler and a matrix of an atmospherically inert cementing agent, forming this composition into large masses or blocks, from which I may subsequently, by well known methods such as are commonly used in the manufacture of brass weights, turn or form weights of desired size and shape.

Weights made in accordance with my present invention possess marked advantages over brass weights in resistance to atmospheric agencies, and accordingly in accuracy after long periods of use. Weights made by a moulding operation as herein described are initially cheaper to produce than brass weights, and may be used with brass weights without involving any buoyancy or volume corrections, and will maintain their accuracy under conditions of hard usage and exposure to unfavorable atmospheric or chemical agencies much better than the best brass weights that can be made by methods at present known. The ability to withstand laboratory fumes without deterioration is a most important advantage of weights made in accordance with my present invention.

Instead of using powdered metallic tungsten as my high density filler material I may employ any other suitable powder having a density in excess of 9. Spongy lead or powdered lead may be used to advantage in the preparation of weights in accordance with my present invention, but is less desirable than tungsten powder because of the tendency of lead to slowly oxidize upon exposure to air and moisture. In one form of my present invention I first prepare a thermoplastic composition from powdered lead and bakelite, and form this composition into weight bodies slightly heavier than the desired final weights. These weight bodies are next treated with a solvent for lead such as dilute nitric acid, for example, which dissolves the minute amount of lead which is present at the exposed surface of the weight. After careful washing, to remove adsorbed nitric acid and lead nitrate, the weight body is calibrated to bring it to the correct final weight. Although I prefer to employ as my filler material a pulverulent metal or metallic compound having a specific gravity in excess of 9 and which is wholly inert to atmospheric agencies, it will be evident from the above that I may successfully employ a filler material which is not wholly inert to atmospheric agencies, and that I may dissolve or remove the minute amount of the filler material which is present at the exposed surface of the weight by a solvent as described. As equivalent to the described process I may coat or cover my composition weights with a thin film of any suitable protecting agent of which I find phenolic condensation product lacquers form the most suitable agents.

I am aware that moulding compositions have long been made by the admixture of bakelite and other synres compositions with a wide variety of filler materials such as wood pulp, precipitated chalk and like materials, but no one has earlier attempted to make, or has seen any advantage in making, thermoplastic mouldable compositions from a matrix material such as bakelite and a filling material having a specific gravity in excess of 9, in such proportions as will make a composition having a specific gravity such that the composition may be used instead of brass in the construction of balance weights and for other like purposes.

It will be evident that many modifications may be made without departing from the essential principles of the disclosure as herein made, and accordingly no limitations should be placed upon my invention except as indicated in the appended claims.

I claim:

1. A weight having substantially the specific gravity of brass comprising an intimate admixture of a chemically inert matrix material having a specific gravity of 5 or less and a pulverulent filler material having a specific gravity of 9 or more.

2. A weight having substantially the specific gravity of brass comprising a homogeneous admixture of a synres and a pulverulent material having a specific gravity of 9 or more.

3. A weight having substantially the specific gravity of brass comprising a homogeneous admixture of a synres and a finely comminuted metal having a specific gravity of 9 or more.

In testimony whereof, I have hereunto subscribed my name this 5th day of December 1928.

WALTER O. SNELLING.